2,868,806

PROCESS FOR THE PURIFICATION OF ALKYLENE OXIDES

Andrew A. Holzschuh, Midland, Mich., assignor to The Dow Chemical Company, Midland, Mich., a corporation of Delaware No Drawing. Application November 12, 1957
Serial No. 695,533

4 Claims. (Cl. 260—348)

This invention relates to a process for the purification of alkylene oxides, such as ethylene and propylene oxides. More particularly it relates to a process for removing certain chlorine-containing impurities from alkylene oxides.

One method for preparing alkylene oxides involves the dehydrohalogenation of the corresponding chlorohydrin by means of lime. As thus prepared, the alkylene oxide product contains a chlorinated product as an impurity. The impurity is thought to be vinylidene chloride or a similar compound, depending upon the feed stock employed in making the alkylene oxide. Chlorine-containing impurities of this nature create disadvantages when the oxide is used in the preparation of polyglycols and other products. Prior attempts to remove such impurities have included fractional and azeotropic distillation, adsorption on charcoal and other adsorbents, and polymerization of the impurities. None of the heretofore attempted techniques has been particularly successful for purposes of removing the mentioned chlorine-containing impurities. It is imperative that the indicated type of impurities be removed from alkylene oxides if the oxides are to achieve their ultimate potential as intermediates for the preparation of other products.

Accordingly it is the principal object of this invention to provide a process for removing the stated chlorine-containing impurities from alkylene oxides, particularly from ethylene and propylene oxides their homologous oxides that contain up to about 8 carbon atoms.

The above and related objects are realized by a process which involves treating the crude propylene or other alkylene oxide which contains chlorinated olefin impurity with an excess of bromine, based on the quantity of the impurity in the alkylene oxide product. The treatment with bromine is followed by distillation to recover the purified alkylene oxide product.

A common procedure for preparing propylene oxide is to react propylene with hypochlorous acid to form propylene chlorohydrin, followed by treatment with lime to form propylene oxide. The other lower alkylene oxides may be prepared similarly by substituting the appropriate olefin for the propylene oxide. When prepared by this procedure, however, the alkylene oxide product unavoidably contains a chlorinated impurity. The impurity may be present in amount of 0.25 by weight or higher, analyzed as chlorine. Thus, if the impurity is 50 percent chlorine, the actual impurity itself may be present in the alkylene oxide product in a concentration of 0.5 percent by weight or higher. Such concentrations of impurities cannot be tolerated when the alkylene oxide is to be employed as an intermediate in subsequent reactions. Crude alkylene oxide products of the described nature are most advantageously treated for purification in accordance with the present invention.

In operation, the bromine is added to the liquefied alkylene oxide product to be purified. It is believed that the bromine reacts with the unsaturated impurity to form a brominated product. Such a compound is readily removed by distillation or similar procedure.

The process is preferably conducted at about room temperature, although temperatures down to about 0° C. may be used with a proportionate increase in reaction time. Temperatures appreciably above room temperature are wasteful of bromine and are difficult to control.

The time of reaction will vary somewhat depending upon the temperature. At room temperature the reaction will usually be complete in from about 15 to 30 hours.

The amount of bromine is to be used in practice of the present invention will vary with the concentration of the chlorine-containing impurity in the crude alkylene oxide product. In all cases, the bromine must be used in molar excess of the impurity concentration. As a general rule, it is beneficial for the quantity of bromine used to be at least in molar proportion to the chlorine-containing impurity being removed. The invention is not to be limited to use of such quantities as a minimum, however, since amounts of bromine down to a slight excess of 0.1 percent or less over the concentration of impurity may be satisfactorily used in order to reduce the concentration of impurity to a level where the alkylene oxide may be used without further purification. When quantities of bromine are employed that are much greater than the quantity of impurity being removed, there is ordinarily no further proportional increase in removal of impurities. As a consequence, such excesses are merely wasteful of bromine.

By way of illustrative example, 500 cubic centimeters of a crude propylene oxide containing vinylidene chloride as an impurity in a concentration of 0.24 percent by weight of the crude propylene oxide, analyzed as chlorine, was placed in a gas washing bottle with a glass frit. To the crude propylene oxide was added 2 cubic centimeters of liquid bromine. The mix was allowed to stand at room temperature for 20 hours. The treated material was then fractionated through a 12 inch Vigreux column at a reflux ratio of 4 to 1. The center fraction, constituting the major portion, was analyzed for chlorine. It was found to contain 0.03 percent by weight of impurity analyzed as chlorine.

When the process was repeated excepting to use chlorine in place of bromine, the impurity content of the center fraction was found to be 0.25 percent by weight analyzed as chlorine.

I claim:

1. A process for removing chlorine-containing, unsaturated impurities from crude lower alkylene oxides containing up to 8 carbon atoms comprising, as essential sequential steps (1) contacting the alkylene oxide with a molar excess of bromine while said crude alkylene oxide is being maintained at a temperature of from about 0° C. to about 30° C., (2) distilling the bromine treated product of step (1) to recover the purified alkylene oxide product.

2. The process claimed in claim 1, wherein said bromine is employed in an amount which is at least molar equivalent to that of said impurity.

3. The process claimed in claim 1, wherein said alkylene oxide and bromine are maintained at about room temperature.

4. The process claimed in claim 1, wherein said alkylene oxide is propylene oxide and said chlorinated unsaturated impurity is vinylidene chloride.

(References on following page)

References Cited in the file of this patent

UNITED STATES PATENTS

| | | |
|---|---|---|
| 2,550,847 | Mitchell et al. | May 1, 1951 |
| 2,615,901 | McClellan | Oct. 28, 1952 |
| 2,622,060 | Robeson et al. | Dec. 16, 1952 |
| 2,697,104 | Lowe et al. | Dec. 14, 1954 |
| 2,756,241 | Courter | July 24, 1956 |
| 2,771,473 | Courter | Nov. 20, 1956 |
| 2,775,600 | Maslan | Dec. 25, 1956 |

FOREIGN PATENTS

| | | |
|---|---|---|
| 651,111 | Germany | Oct. 7, 1937 |